(12) United States Patent
Renner et al.

(10) Patent No.: US 11,683,184 B2
(45) Date of Patent: Jun. 20, 2023

(54) PROBLEM MANAGEMENT IN A USER SYSTEM

(71) Applicant: INTERNATIONAL BUSINESS MACHINES CORPORATION, Armonk, NY (US)

(72) Inventors: Stefan Renner, Stuttgart (DE); Christian Wilhelm Paul Hoerst, Boeblingen (DE); Johannes Severin Kern, Boeblingen (DE); Felix Beier, Haigerloch (DE)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 17/101,403

(22) Filed: Nov. 23, 2020

(65) Prior Publication Data

US 2022/0166630 A1    May 26, 2022

(51) Int. Cl.
| | | |
|---|---|---|
| *H04L 29/06* | (2006.01) | |
| *H04L 9/32* | (2006.01) | |
| *G06F 8/65* | (2018.01) | |
| *G06F 11/36* | (2006.01) | |
| *G06F 21/44* | (2013.01) | |
| *H04L 9/30* | (2006.01) | |

(52) U.S. Cl.
CPC ........... *H04L 9/3247* (2013.01); *G06F 8/65* (2013.01); *G06F 11/366* (2013.01); *G06F 21/44* (2013.01); *H04L 9/3073* (2013.01)

(58) Field of Classification Search
CPC ....... H04L 9/3247; H04L 9/3073; G06F 8/65; G06F 11/366; G06F 21/44
USPC ........................................................ 713/176
See application file for complete search history.

(56) References Cited

U.S. PATENT DOCUMENTS

| | | | |
|---|---|---|---|
| 7,343,529 B1 | 3/2008 | Klinkner | |
| 9,304,827 B2 | 4/2016 | Werth | |
| 2014/0123180 A1 | 5/2014 | Xiao | |
| 2015/0170430 A1* | 6/2015 | Von Querfurt | ......... G07C 5/008 |
| | | | 701/29.1 |
| 2016/0071331 A1* | 3/2016 | Angus | .................... G06Q 10/20 |
| | | | 701/29.1 |
| 2018/0068114 A1 | 3/2018 | Matsuura | |
| 2018/0150348 A1 | 5/2018 | Hecox | |

FOREIGN PATENT DOCUMENTS

CN          110647420 A       1/2020

OTHER PUBLICATIONS

IBM, "Response to United Kingdom Intellectual Property Office Examination Report dated Jun. 16, 2022," UK Patent Application No. 2115857.1, dated Nov. 23, 2022, 20 pages.
United Kingdom Intellectual Property Office, "Patents Act 1977: Combined Search and Examination Report Under Sections 17 and 18(3)," Application No. GB2115857.1, dated Jun. 16, 2022, 11 pages.

* cited by examiner

*Primary Examiner* — Evans Desrosiers
(74) *Attorney, Agent, or Firm* — Anthony R. Curro (57) ABSTRACT

The present disclosure relates to a problem management method for a user system. A method may include detecting an error in the user system. A signed package may be provided in accordance with the detected error, wherein the package comprises at least a script. The user system may verify the authenticity of the package using a signature of the package, and may execute the script if the package is authentic.

20 Claims, 6 Drawing Sheets

PROBLEM MANAGEMENT IN A USER SYSTEM

BACKGROUND

The present invention relates to the field of digital computer systems, and more specifically, to a problem management method.

Problem management may include the activities required to diagnose a root cause of problems identified through a problem management process, and to determine the resolution to those problems. However, the problem management is also responsible for ensuring that the resolution is implemented through an appropriate control procedure.

SUMMARY

Various embodiments provide a problem management method, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method comprising: detecting an error in the user system; providing (or receiving) a signed package in accordance with the detected error, the package comprising at least a script (the script may be named corrective script or diagnostic script); verifying by the user system the authenticity of the package using a signature of the package; and executing by the user system the script if the package is authentic.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system comprising a processor and a computer-readable storage medium having computer-readable program code embodied therewith, the computer-readable program code configured to perform a method comprising: detecting an error in the user system; providing (or receiving) a signed package in accordance with the detected error, the package comprising at least a script; verifying by the user system the authenticity of the package using a signature of the package; and executing by the user system the script if the package is authentic.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The user system may be provided by a service provider. A user (e.g. customer) of the user system may interact, e.g. using a workstation, with the user system through a predefined service interface. The service interface may enable limited access to the user system. The user system may have multiple functions. The service interface may enable access to a minimum number of functions of the user system, e.g. one or two functions. For example, the service interface may be a generic interface for trace/log file collection, e.g. the user may only monitor outputs/logs of the user system. Thus, a first problem may be that the service interface is not sufficient to handle a specific problem in the user system— let alone fix the problem.

The user system may be an appliance. The appliance may, for example, be a storage appliance such as IBM Db2 database system. However, the appliance may be complex as it may be composed of many components that interact with each other. In various embodiments, the appliance may be any suitable computer system comprised of software, hardware, or both software and hardware. This may be a source of a second problem, because the behavior of the appliance may be difficult to model or predict due to the dependencies or other types of interactions between the components. Thus, understanding and fixing an error or problem in the user system may be a very resource consuming task in particular if it is not performed by a service provider, e.g., the maker of the appliance or an authorized service provider. The detected error may be a flaw or fault in the user system that causes it to produce an incorrect or unexpected result, or to behave in unintended ways. The detected error may, for example, be a software and/or hardware error.

The present subject matter may solve these issues by providing a problem management system of the service provider that creates and provides a package for fixing the detected error. The user system can thus fix the error using the provided package without having to find the corrections locally in the user system. In another example, the execution of a script of predefined commands in the provided package may enable the root cause or causes to be identified, in particular for hardware-based errors. The package may be referred to as a "service package." The service package may collect diagnostic data. If, for example, the hardware has issues, the service package may execute a script that narrows down possible causes to find the root cause of the failure.

However, because the service package is not required to be run by the maker of the appliance or an authorized service provider, a provided service package may be misused if its execution is not controlled, e.g., run on an unauthorized appliance. For that, the present subject matter may control the provision of the service package and execution of the script using a signature, e.g. the user system can only execute the script if it has access to a public key. Also, by signing the package, it can be guaranteed that only scripts provided by the service provider can be executed on the user system. The signature may be a digital signature. The digital signature may be a mathematical scheme for verifying the authenticity of the package. The signature may, for example, be generated using a public-private pair key scheme.

The script of the provided service package may be named corrective script or diagnostic script. It may provide a capability to correct the detected error or to perform a diagnosis of the detected error in order to identify root causes. It may, for example, be sufficient to use the service package for gathering more diagnostic information about the detected error, which may then be used by the support engineer to create another service package comprising the actual steps for correcting the detected error. In this case, the method further comprises upon executing the corrective script, receiving diagnostic information about the detected error, and providing another service package based on the gathered information. The user system may verify again the signature of the new provided service package and may execute the new script of the new provided service package.

The present subject matter may enable short turnaround times of problem/service requests. In addition, when the maker of the appliance or an authorized service provider attempts to resolve a problem reported by a user, the service provider may employ a screen-sharing session. These sessions are used to gather information for a specific problem and upload that information to a problem management system, or to apply workarounds/fixes, e.g., by applying a software update package. An advantage of the present embodiments, is that the screen-sharing approach need not be employed. The user can use the user system (appliance) while the problem is being analyzed/fixed by the problem management system because the user system is not blocked (e.g., by a support engineer doing analysis using the user's workstation via a screensharing session) while the problem is being analyzed by the script of the service package running in the background.

According to one embodiment, the service package comprises metadata. The metadata comprises a maximum execution count, wherein the execution of the script is performed in response to determining that the number of previous executions of the script on the user system is smaller than the maximum execution count. This embodiment may enable to set the number of how many times (e.g., once or x-times) a script can be executed to prevent re-execution and data leakage for select cases.

The signature of the package is indicative of the content of the metadata and the script as provided by the problem management system. That is, any change in the metadata and/or script may lead to a non-authentication of the package. The execution of the script may be performed using the metadata, e.g. the metadata enables an initialization of one or more variables of the script. The same metadata that is used to perform verification of the package is used to execute the script. The script may not be executed if the metadata has changed in the user system. For example, since the metadata is part of the data that is signed, it cannot be tampered with without destroying the signature. The user system may detect such an illegal or unauthorized activity and, in response, the user system simply doesn't execute the script.

According to one embodiment, wherein the signed package is received from the problem management system that is configured to remotely connect to the user system, wherein the determining that the number of previous executions of the script on the user system is smaller than the maximum execution count comprises: determining by the user system that the number of previous executions of the script on the user system is smaller than the maximum execution count; and determining by the problem management system that the number of previous executions of the script on the user system is smaller than the maximum execution count.

For example, the check that the number of previous executions of the script is smaller than the maximum execution count may be performed by both the user system and the problem management system and only if both checks are successful, the script may be executed. If the check fails on either the user system or the problem management system, the method comprises: exiting and reporting by the user system a check error back to the problem management system. This embodiment may further improve the control of the execution of the script as it requires that both systems have to agree on the number of times the script has been executed, e.g. this may prevent the user system from executing the package without the consent of the problem management system.

The number of previous executions of the script may be determined in different ways. For example, a log that saves the history of executions in the user system may be used to determine said number in the user system. The problem management system may also use its own log, e.g. that logs the provided packages, to determine said number.

According to one embodiment, the user system and the problem management system comprise an execution counter indicating the number of previous executions of the script. The method further comprises incrementing the execution counter in case the execution of the script is successful. For example, the execution counter may be incremented in the problem management system upon receiving a report from the user system indicating that the execution of the script is successful. This may particularly be advantageous if the user system is configured to automatically report the result of the execution.

In another example, the execution counter may be incremented in the problem management system and in the user system each time the package having the same script is provided by the problem management system. This may be advantageous as the problem management system does not rely on the user system's report to count the number of executions. This may, for example, prevent a misuse case where the user system (knowing the count check feature) may not send the report in order to be able to further execute the package (beyond the permitted number of executions) by making use of the same existing count.

According to one embodiment, the package comprises metadata. The metadata comprises a unique identifier of the user system, wherein the execution of the script is performed in response to determining that the user system has that unique identifier. The unique identifier may, for example, be a serial number of the user system. In this way, the signed package can be tailored to only run on one particular machine and no other.

According to one embodiment, the detecting of the error comprises: automatically detecting the error by a monitoring unit of the user system or detecting by a user of the user system the error; and providing the detected error to a problem management system, wherein the providing of the signed package is performed by the problem management system.

According to one embodiment, the user system may schedule the execution of the script using one of the following three execution methods: executing the script immediately after determining that the package is authentic, or executing the script in a predefined maintenance time window; or executing the script after receiving a user approval of execution of the script. Thus, the script is provided such that the application of the script is customizable, e.g. such that the time slot in which the script is executed can be chosen by the user.

This embodiment may enable multiple scheduling strategies. For example, if the customer sets the execution strategy to "immediate" in his configuration, the scheduler of the user system will execute the script immediately after it has been submitted. If the customer sets the execution strategy to "approval" in his configuration, he needs to approve the execution of each and every script. The customer will be notified about each new script submitted to his system, so that he can act timely. If the customer sets the execution strategy to "maintenance window" in his configuration, he can define maintenance windows in his configuration. Scripts will only be executed in maintenance windows. If there is no maintenance window, but there are scripts queued for execution, they may not be executed. The customer may first have to define a new maintenance window. The customer will be notified about such situations.

According to one embodiment, the method further comprises: providing a report on results of the execution of the script and combining it with the package in an integrity protective manner In one example, the user of the user system may transfer the execution results from the user system to his workstation in order to create the report and may upload from the workstation the report to the problem management system. In another example, the report may be created by and sent by the user system to the problem management system via a direct secure connection between the user system and the problem management system. The report may or may not be reviewed by the user. For example, the execution results may be saved in an archive file. This archive file may be reviewed by the user to check that no sensitive data is contained in the archive before submitting it to the problem management system.

According to one embodiment, the provision of the signed package comprises one of: sending the service package to the user system via an established secure connection between the user system and the problem management system, or downloading the service package from the problem management system to the user system. For example, the user of the user system may download the service package to the workstation of the user and then transfer it from the workstation to the user system when the script is to be executed.

According to one embodiment, the method is automatically performed. This may fix the detected error in time without relying on user interventions. For example, the error may be detected automatically by the user system and a support request may be sent by the user system automatically to the problem management system indicating the detected error. The problem management system may create and provide the package automatically to the user system upon receiving the support request. For example, the problem management system may use a history file comprising a mapping between previously detected errors and associated scripts. That file may be used by the problem management system to create the script by identifying an entry and associated script that corresponds to the detected error in the file. The service package may, for example, be derived based on appliances of other user systems who had similar issues that were resolved by a particular (set of) service package(s).

The automatic execution of the script may be triggered by the problem management system. The user of the user system may allow this automatic execution by enabling a direct communication from the problem management system to the user system where the script should be executed.

In another example, a manual execution of the script may allow the user to review what is executed and review what will be sent to the problem management system.

According to one embodiment, the script is unencrypted. The method further comprises: analyzing the script for logging one or more operations performed by the script in an audit log, and providing the audit log for enabling an inspection of operations performed on the user system. This may allow the user to investigate the script. For example, the user may be requested to provide the audit log to an auditing authority (e.g., a tax authority) for auditing the scripts that have been applied to the user system.

The service package may only be provided upon user authentication of the user of the user system. The problem management system may check authenticity of the user of the user system before providing the package. According to one embodiment, the method comprises receiving a support request from the user of the user system indicating the detected error, and authenticating the user, wherein the package is provided if the user is authenticated.

Figure 1:
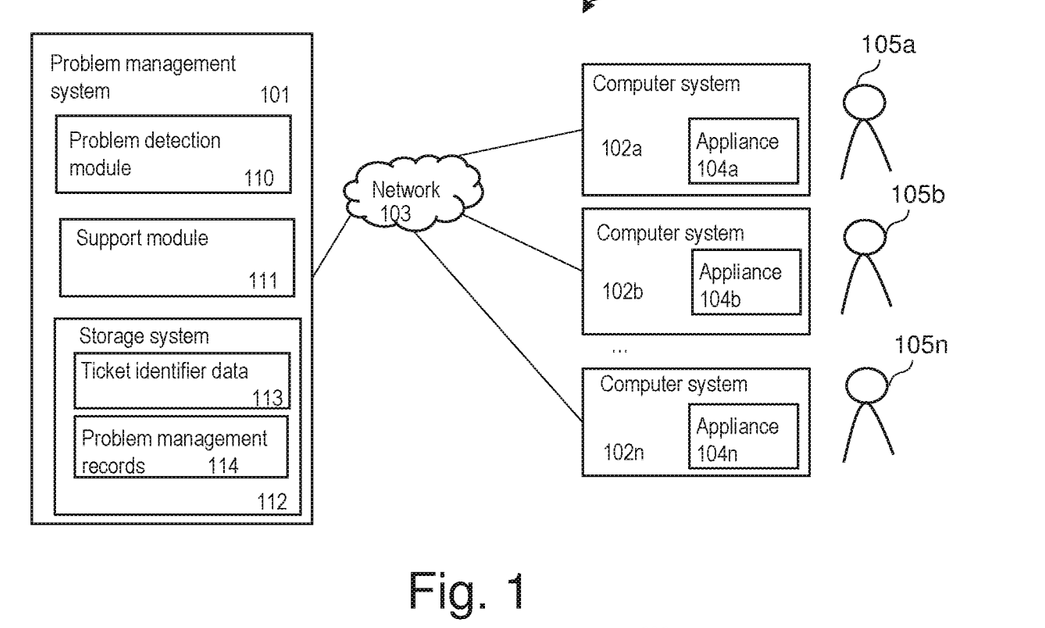
FIG. 1 illustrates a service system in accordance with an example of the present subject matter.

FIG. 1 illustrates a service system 100 in accordance with an example of the present subject matter. The service system 100 comprises a problem management system 101 and one or more computer systems (or user systems) 102a-n. The problem management system 101 may be configured to communicate with each of the computer systems 102a-n via one or more networks 103. For simplification of the description only one network is shown; however, the problem management system 101 may connect to the computer systems 102a-n via more than one network, e.g. the problem management system 101 may connect to each of the computer systems 102a-n via a respective network. For example, the network 103 may include, but is not limited to, a cable network, an optical fiber network, a hybrid fiber coax network, a wireless network (e.g., a Wi-Fi and/or mobile telephone network), a satellite network, the Internet, an intranet, a local area network, any other suitable network, and/or any combination of these networks.

As shown, a user 105a-n may be associated with the computer systems 102a-n respectively, e.g., an instance of computer system 600. The user 105a-n may include a viewer, owner, support technician etc. The user 105a-n may use a workstation (not shown) in order to interact or communicate with the computer system 102a-n and the problem management system 101. Each computer system 102a-n may include an appliance 104a-n. The appliance 104 may be a hardware-software appliance. For example, the appliance 104a-n may be an IBM Db2 Analytics Accelerator. The user 105a-n may only interact with the appliance 104a-n through provided service interfaces, e.g. the user cannot access the appliance itself. These service interfaces may not be sufficient to handle a specific problem—let alone fix the problem. For example, the appliance may not provide an end user (customer) with possibility to open a shell that could be used for problem analysis and fixing. The user 105a-n may, thus, need to involve the creator/producer of the appliance 104a-n or an authorized service provider, as only very limited pre-provided, generic service interfaces, such as trace/log file collection, are available to the end user.

The problem management system 101 provides support for the computer systems 102a-n. The problem management system 101 may be remote to the computer systems 102a-n, accessible over the network 103. The problem management system 101 may handle at least part of processing of errors when they occur on the computer systems 102a-n. The problem management system 101 may provide a description of and remedy for the error when it occurs on the computer systems 102a-n. The remedy may be provided in accordance with a problem management method, e.g. as described with reference to FIG. 2. To this end, the problem management system 101 may be implemented by any combination of computing devices (e.g., servers, one or more instances of computer system 600) as may serve a particular implementation.

The problem management system 101 may include a problem detection module 110, a support module 111, and a storage system 112 selectively and communicatively coupled to one another. The problem detection module 110 may be configured to receive (e.g., detect) a support request from the computer system 102a-n. The support request may automatically be provided or may be provided by the user 105a-n upon occurrence of an error in the computer system 102a-n.

The support module 111 may be configured to perform one or more support session management operations as may serve a particular implementation. For example, the support module 111 may, in response to the support request received by the problem detection module 110, process the information included in the support request, open a support ticket associated with the support request, and assign a unique ticket identifier associated with the support ticket to the support request. For example, the support module 111 may use the ticket identifier to establish a remote-control session to the computer system.

Storage system 112 may be configured to store ticket identifier data 113 representative of one or more ticket identifiers generated by support module 111 and problem management records (PMRs) 114 comprising information on the detected errors in the computer systems 102a-n.

Figure 2:
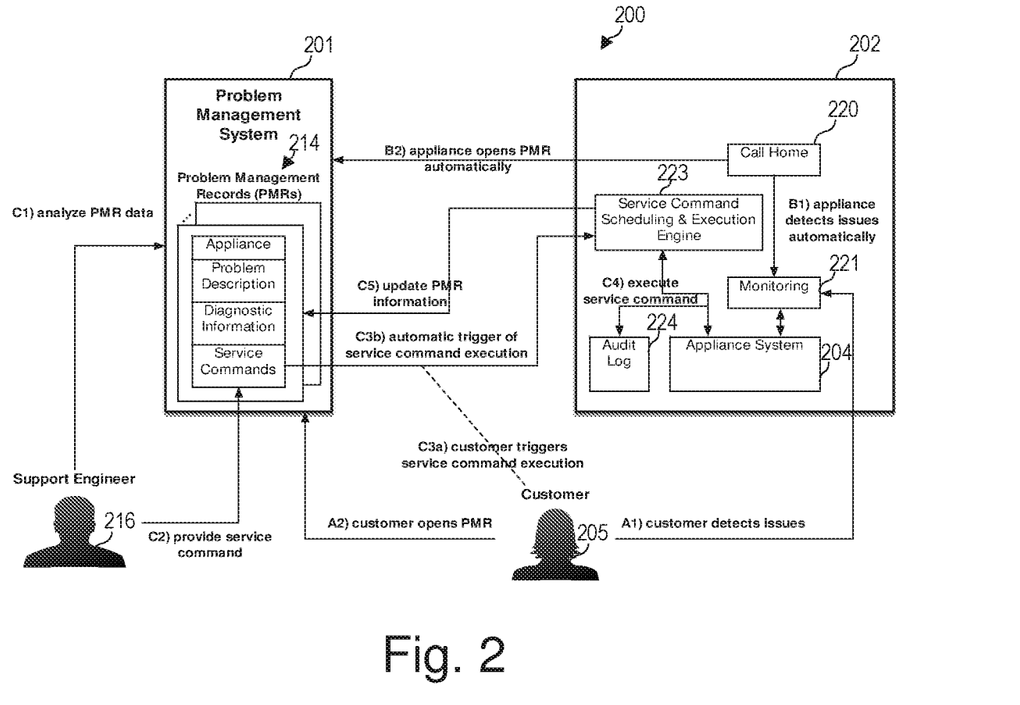
FIG. 2 illustrates a service system in accordance with an example of the present subject matter.

FIG. 2 is a block diagram of a service system 200 illustrating a problem management method for supporting a computer system in accordance with an example of the present subject matter. FIG. 2 illustrates an example of the problem management method as performed between the problem management system of FIG. 1 and one of the computer system 102a-n.

The service system 200 may comprise a problem management system 201 and a computer system 202. The problem management system 201 is similar to the problem management system 101 of FIG. 1 and the computer system 202 is similar to a computer system 102a-n of FIG. 1. The computer system 202 comprises an appliance 204. The appliance 204 may, for example, be a DB2 system. The appliance 204 may automatically be monitored by a monitoring unit 221 or may be monitored by the help of the user 205. Thus, an error or issue in the appliance 204 may automatically or manually be detected in step B1 or step A1 respectively. If the error is detected by the monitoring unit 221, a call home unit 220 may receive an indication of the error from the monitoring unit 221. Upon receiving the indication, the call home unit 222 may automatically open (step B2) a problem management record in the problem management system 201. This may, for example, be performed by sending in step B2 a support request to the problem management system 201. If the error is detected manually, the user 205 may open (step A2) a problem management record in the problem management system 201. This may, for example, be performed by entering in step A2, e.g. via an interface, a support request to the problem management system 201. Upon receiving the support request, the problem management system 201 may automatically create the problem management record 214. As shown, the problem management record 214 may comprise information indicative of the appliance 204, a description of the problem, a diagnostic information and a signed service package (comprising one or more service commands) that is provided, e.g. to fix the problem. A support engineer 216 of the problem management system 201 may analyze (step C1) the data of the problem management record 214 and may provide accordingly (in step C2) the service package. In another example, the service package may automatically be created by the problem management system 201. The service package may comprise metadata and payload. The payload may comprise a script (named corrective script) to be executed and one or more resource files containing additional information needed by the corrective script to be executed to fix an error and/or collect diagnostic information on the error. The metadata may comprise information indicative of a creator of the service package, a serial number of the computer system 202, a maximum execution count of the corrective script, e.g. using a one-time password, a name of the corrective script to be executed, a name of the file to contain the execution results and a signature indicative of the content of the package. The service package may be provided to the user 205 or to a service command scheduling and execution engine 223 of the computer system 202. If the service package is provided to the user 205, the user 205 may trigger (step C3a) the execution of the corrective script by the service command scheduling and execution engine 223. If the service package is provided to the service command scheduling and execution engine 223, this may automatically trigger (step C3b) the service command scheduling and execution engine 223 to schedule the execution of the corrective script. The corrective or diagnostic script may be executed in step C4 on the appliance, e.g. in order to fix the detected error. The results of the execution of the corrective script may be used to update (step C5) the PMR 214 and to fill an audit log file 224 of the computer system 202. The audit log file 224 may also be stored in the problem management system 201. The audit log file 224 may contain the complete service package (metadata and payload), who submitted the service package for execution (which might only be known on the customer system when using the automatic approach), the complete execution results, time when the corrective script has been submitted for execution, time when execution started, time when execution finished, configuration details about the execution scheduling strategy, who reviewed and approved the execution results and when (if approval is necessary), log creation of scripts in problem management system 201, and log execution of scripts on appliance 204.

Figure 3:
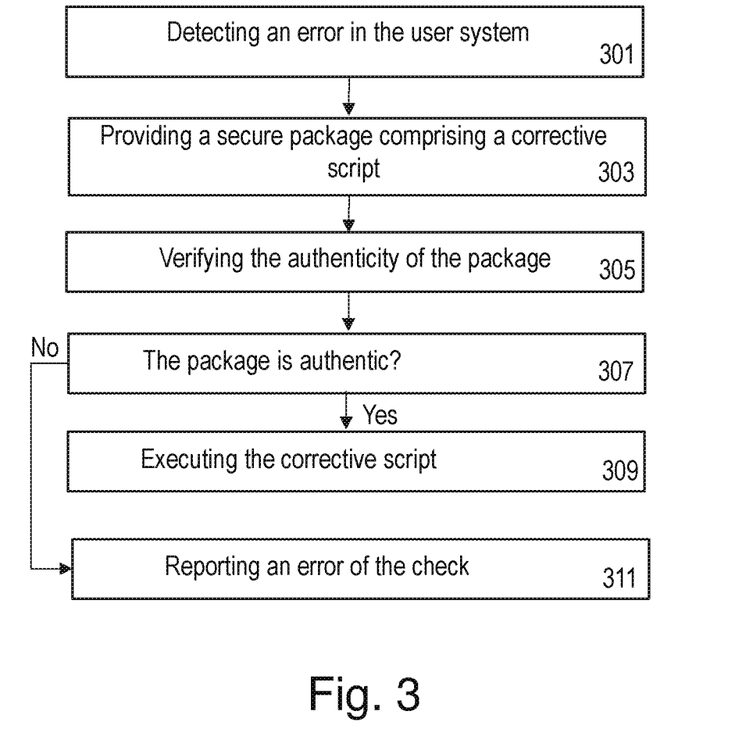
FIG. 3 is a flowchart of a problem management method in accordance with an example of the present subject matter.

FIG. 3 is a flowchart of a problem management method for a user system in accordance with an example of the present subject matter. For the purpose of explanation, the method described in FIG. 3 may be implemented in the system illustrated in FIGS. 1-2, but is not limited to this implementation.

An error may be detected in step 301 in the user system 202. The detected error may, for example, have one or more predefined error codes such as DB2 error codes. The error may, for example, be associated with an error description that is provided by the user system 202. For example, the error description may indicate an unavailable resource if someone is locking the data being used by the appliance. The error may automatically be detected by the user system 202 using the monitoring unit 221 and may be reported to the problem management system 201. In another example, the error may be detected by the user 205, e.g. using a service interface on his workstation, wherein the service interface displays the results of monitoring by the monitoring unit 221. The user 205 may use the workstation to report the error to the problem management system 201.

In response to detecting the error, the problem management system 201 may provide a signed package in step 303 to the user system 202. The signed package may be referred to as a trusted service package. The package may comprise at least a corrective script (comprising one or more service commands) that, when executed on the user system 202 may, for example, fix the detected error. In one example, the package may be provided with additional information that enables a controlled execution of the corrective script. For example, the package may comprise metadata and payload. The payload comprises the corrective script. The payload may, for example, further comprise one or more resource files containing additional information that may be needed by the corrective script to be executed. The metadata may indicate a creator (e.g. support engineer 216 who created the service commands), a serial number of the user system 202, a maximum execution count (e.g. a one-time password for executing the corrective script), a name of the corrective script, a name of the file to contain the execution results and a signature. The signature is obtained by signing the package.

In one example, the corrective script may automatically be determined by the problem management system, e.g. using a mapping between known errors and associated corrective scripts. The mapping may, for example, map error codes with corrective scripts that may, for example, fix the problems having the error codes respectively. The problem management system may be able to maintain a history of corrective actions based upon other user's experiences. These corrective actions may be used to provide the corrective script.

The user system 202 may verify the authenticity of the corrective script with the signature in step 305. In case the script is authentic (inquiry step 307) the user system 202 may execute in step 309 the corrective script; otherwise the corrective script may not be executed and a check error may be reported to the problem management system in step 311.

The execution of the corrective script may or may not be successful. If it is not successful, the user system 202 may send a report error to the problem management system 201. In response, the problem management system 201 may, for example, send another signed package with another corrective script and steps 305 to 309 may be repeated with the other service package.

The execution of steps 305 to 309 may be controlled by the problem management system 201, e.g. the problem management system 201 may trigger the execution of the steps 305 to 309 via a direct connection between the problem management system 201 and the user system 202, e.g. by sending a control command to the user system, and upon receiving the control command the user system may schedule the execution of the steps 305 to 309, e.g. according to "immediate" strategy or "maintenance window" strategy. This may be advantageous as the problem management system 201 may have the control on when the execution of the corrective script is to be scheduled.

After execution (successful or unsuccessful), execution results may be collected by the user system 202. The data being collected may be defined in the metadata of the package. Furthermore, the return code of the script execution, as well as all content written to STDOUT and STDERR during script execution may be captured, written to a file and included in the execution results. The execution results may be saved in an archive file. This file can be reviewed by the user to check that no sensitive data is contained in the archive before submitting it to the problem management system. When using automatic execution of the method of FIG. 3, the customer/user 205 may decide whether to review the data before submitting it to the problem management system. If this is set, the customer may be notified that execution results are available for review and approval. If he approves, the data may be uploaded automatically to the problem management system via the secure connection. When using manual execution, it is the customer's responsibility to upload the execution results manually to the problem management system. In this case, he has the possibility to review the data contained in the archive file. If he approves, he uploads the data to the problem management system.

Figure 4:
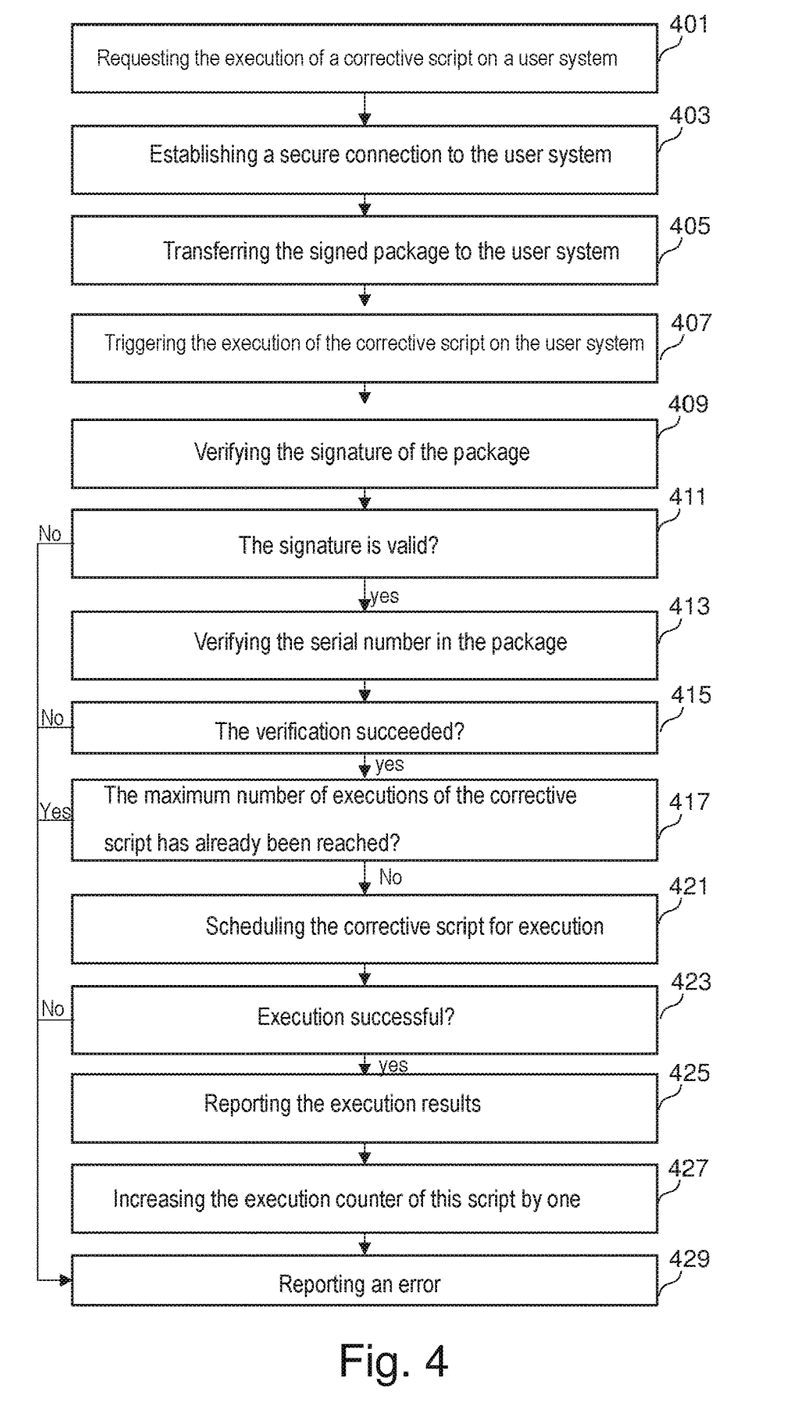
FIG. 4 is a flowchart for fixing a detected error in a user system in accordance with an example of the present subject matter.

FIG. 4 is a flowchart for fixing or diagnosing a detected error in a user system in accordance with an example of the present subject matter. For the purpose of explanation, the method described in FIG. 4 may be implemented in the system illustrated in FIGS. 1-2, but is not limited to this implementation. The method FIG. 4 may enable an automatic execution of the corrective script. The corrective script may enable to fix or diagnose the detected error. The user of the user system may allow this automatic execution by enabling a direct communication from the problem management system to the user system where the corrective script should be executed. In this case, the problem management system may trigger the following sequence of actions of the method of FIG. 4.

In step 401, the problem management system 201 requests the execution of the corrective script on the user system 202. In step 403, the problem management system 201 establishes a secure connection to the user system 202. In step 405, the problem management system 201 transfers the signed package including the corrective script to the user system 202. In step 407, the problem management system 201 triggers the execution of the corrective script on the user system 202, e.g. the problem management system 201 triggers the execution of remaining steps of the method of FIG. 4. The user system 202 verifies in step 409 the signature of the package. If (inquiry step 411) it is valid, the user system 202 continues in the process with step 413, if not, it exits and reports the error back in step 429 to the problem management system 201. In step 413, the user system 202 verifies the serial number in the package and compares it with the user system's serial number. If (inquiry step 415) the comparison succeeded, it continues in the process with step 417, if not, it exits and reports the error back in step 429 to the problem management system 201. The user system 202 checks in step 417 whether this specific correcting script has already been executed before. In addition to that, the problem management system 201 checks whether this corrective script has been executed before on the user system 202. The user system 202 and the problem management system 201 may check whether the maximum number of executions (stored in the user system 202 and in the problem management system 201) has already been reached. If (inquiry step 417) this check fails on either the user system 202 or the problem management system 201, the user system 202 exits and reports the error back to the problem management system 201 in step 429. If (inquiry step 417) not, the process continues with step 421. In step 421, the user system 202 schedules the corrective script for execution. In case (inquiry step 423) of successful execution, the user system 202 may report in step 425 the execution results to the problem management system 201, and the user system 202 and problem management system 201 may increase in step 427 the execution counter of this corrective script by one. For example, in case of unsuccessful execution, an error may be reported in step 429.

Figure 5A:
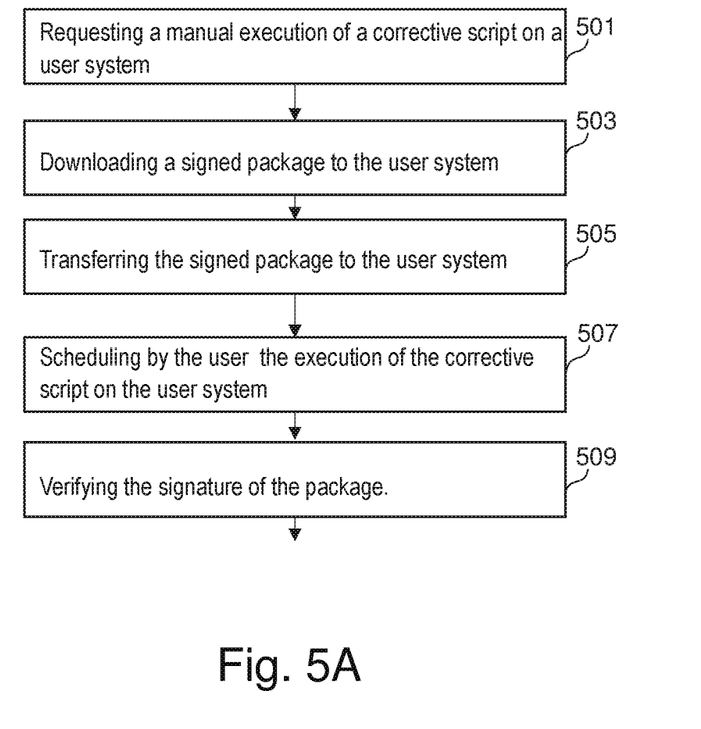
FIGS. 5A, 5B depicts a flowchart for fixing a detected error in a user system in accordance with an example of the present subject matter.
Figure 5B:
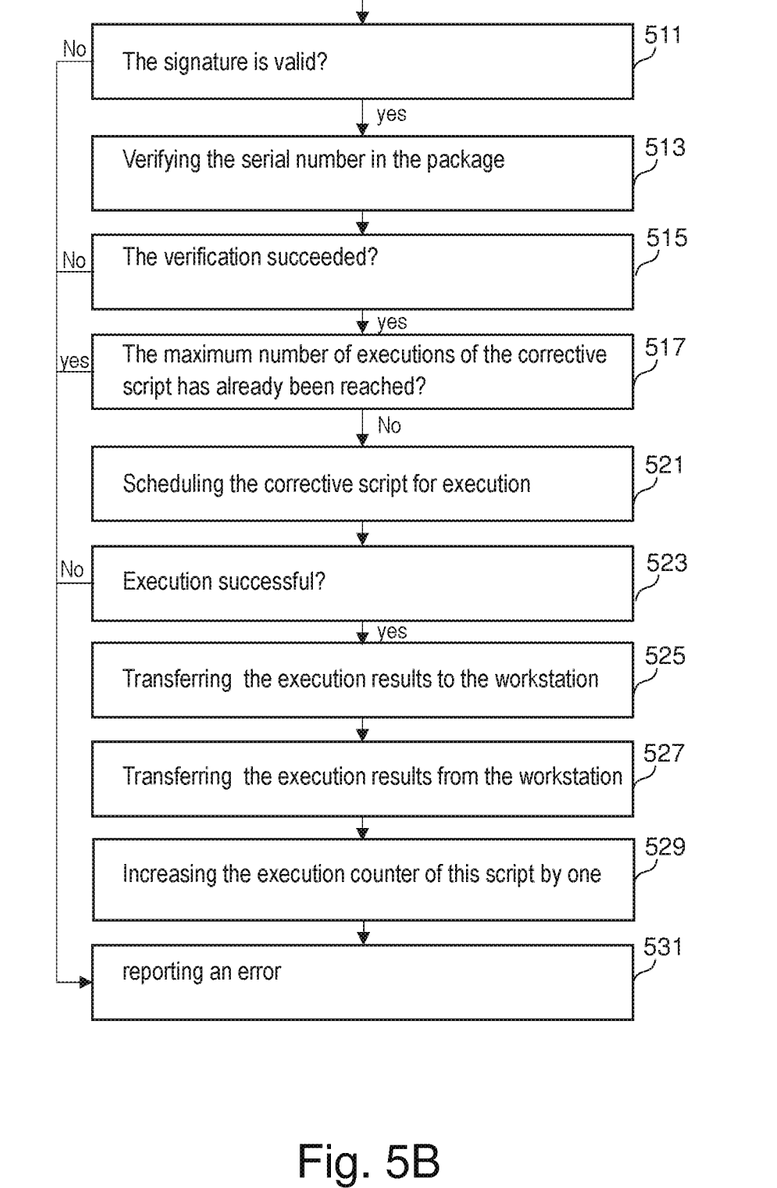

FIGS. 5A, 5B depicts a flowchart for fixing or diagnosing a detected error in a user system in accordance with an example of the present subject matter. For the purpose of explanation, the method described in FIGS. 5A, 5B may be implemented in the system illustrated in FIGS. 1-2, but is not limited to this implementation.

In step 501, the problem management system 201 requests a manual execution of a corrective script by attaching the signed package to the problem management system 201 and attaching a message to the customer 205 requesting the execution. The corrective script may enable to fix or diagnose the detected error. The customer downloads the package to his workstation in step 503. The customer transfers in step 505 the package from his workstation to the user system 202 where the script should be executed. The customer schedules in step 507 the execution of the script by, for example, selecting it in the service interface from a list of available scripts on the user system and by clicking an execute button. This step 507 may include means to specify an execution schedule, e.g., instantly or in the future within a maintenance period.

The user system 202 verifies in step 509 the signature of the package. If (inquiry step 511) it is valid, the user system 202 continues in the process with step 513, if not, it exits and reports the error back in step 531 to the problem management system 201. In step 513, the user system 202 verifies the serial number in the package and compares it with the user system's serial number. If (inquiry step 515) the comparison succeeded, it continues in the process with step 517, if not, it exits and reports the error back in step 531 to the problem management system 201. The user system 202 checks in step 517 whether this specific corrective script has already been executed before. In addition to that, the problem management system 201 checks whether this corrective script has been executed before on the user system 202. The user system 202 and the problem management system 201 may now check whether the maximum number of executions (stored in the user system 202 and in the problem management system 201) has already been reached. If (inquiry step 517) this check fails on either the user system 202 or the problem management system 201, the user system 202 exits and reports the error back to the problem management system 201 in step 531. If (inquiry step 517) not, the process continues with step 521.

The user system schedules in step 521 the script for execution and saves the execution results locally. In case (inquiry step 523) of successful execution, the user system may increase in step 529 the execution counter of this script by one. The customer transfers in step 525 the execution results from the user system 202 to his workstation. The customer transfers in step 527 the execution results from his workstation and uploads them to the problem management system 201. The problem management system 201 may save the execution results. The problem management system 201 may increase the execution counter of this script by one. For example, in case of unsuccessful execution, an error may be reported in step 531.

Figure 6:
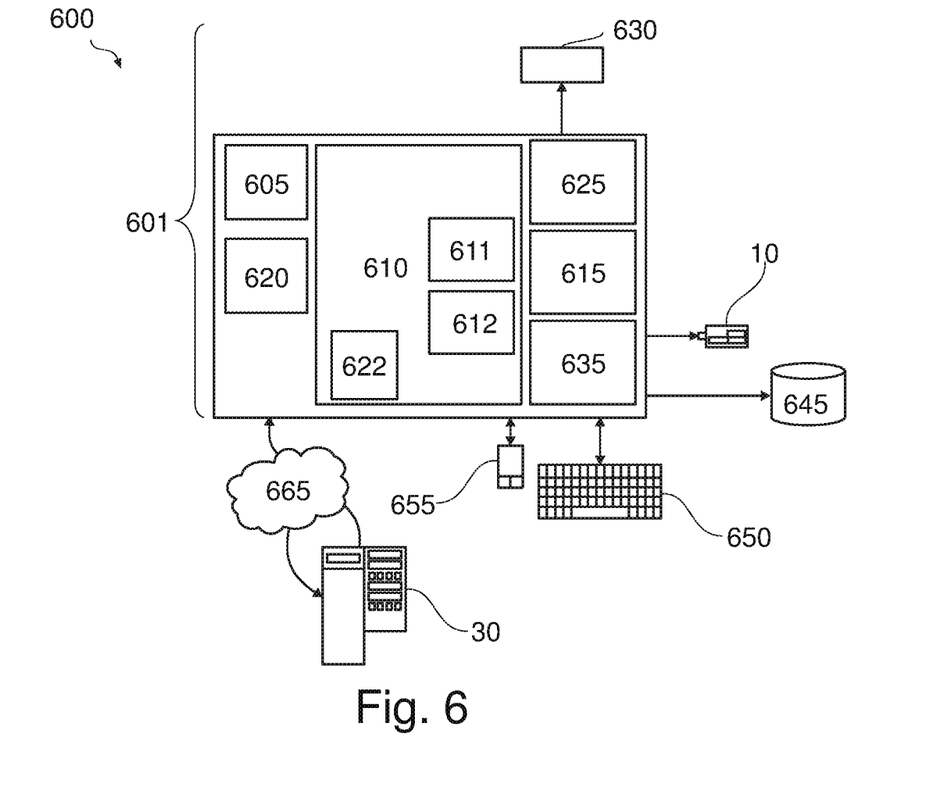
FIG. 6 represents a computerized system, suited for implementing one or more method steps as involved in the present disclosure.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes instructions 612, e.g. instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A problem management method for a user computing system, the method comprising:
    detecting an error in the user computing system provided by a service provider, a user accessing the service provider via a service interface;
    receiving by the computing user system a signed package in accordance with the detected error in the user computing system, the package comprising at least a corrective or diagnostic script for correcting or diagnosing the detected error by the service provider without having to find corrections or diagnoses locally in the user computing system;
    verifying by the user computing system the authenticity of the package using a signature of the package; and
    executing by the user computing system the script if the package is authentic, the script enabling one or more root causes of the detected error in the user computing system to be identified.

2. The method of claim 1, wherein the package comprises metadata, the metadata comprising a maximum execution count; and
    wherein the execution of the script is performed in response to determining that the number of previous executions of the script on the user system is smaller than the maximum execution count.

3. The method of claim 2, wherein the signed package is received from a problem management system that is configured to remotely connect to the user system, and wherein the determination that the number of previous executions of the script on the user system is smaller than the maximum execution count comprises:
    determining by the user system that the number of previous executions of the script on the user system is smaller than the maximum execution count; and
    determining by the problem management system that the number of previous executions of the script on the user system is smaller than the maximum execution count.

4. The method of claim 3, wherein the user system and the problem management system comprise an execution counter indicating the number of previous executions of the script, the method further comprising incrementing the execution counter in case the execution of the script is successful.

5. The method of claim 1, wherein the package comprises metadata, the metadata comprising a unique identifier of the user system, and wherein the execution of the script is performed in response to determining that the user system has that unique identifier.

6. The method of claim 1, wherein detecting the error further comprises:
    automatically detecting the error by a monitoring unit of the user system or detecting by a user of the user system the error; and
    providing the detected error to a problem management system, wherein the providing of the signed package is performed in response to the reception of the detected error by the problem management system.

7. The method of claim 1, wherein execution of the script is performed:
    immediately after determining that the package is authentic;
    in a predefined maintenance time window; or
    after receiving a user approval of execution of the script.

8. The method of claim 1, further comprising:
    sending the service package to the user system via an established secure connection between the user system and the problem management system; or downloading the service package from the problem management system to the user system.

9. The method of claim 1, wherein the method is automatically performed.

10. The method of claim 1, wherein the script is unencrypted, the method further comprising analyzing the script for logging one or more operations performed by the script in an audit log, and providing the audit log for enabling an inspection of operations performed on the user system.

11. The method of claim 1, the method comprising:
receiving a support request from a user of the user system indicating the detected error, authenticating the user, wherein the package is provided by a problem management system if the user is authenticated.

12. The method of claim 1, wherein the user system comprises an appliance database system.

13. The method of claim 1, wherein the signature of the package is verified using a public-private pair key scheme.

14. A computer program product comprising a computer-readable storage medium having computer-readable program code embodied therewith, the computer-readable program code configured to perform a method comprising:
detect an error in a user computing system provided by a service provider, a user accessing the service provider via a service interface;
receive by the user computing system a signed package in accordance with the detected error in the user computing system, the package comprising at least a corrective or diagnostic script for correcting or diagnosing the detected error by the service provider without having to find corrections or diagnoses locally in the user computing system;
verify by the user computing system the authenticity of the package using a signature of the package; and
execute by the user computing system the script if the package is authentic, the script enabling one or more root causes of the detected error in the user computing system to be identified.

15. The computer program product of claim 14, wherein the package comprises metadata, the metadata comprising a maximum execution count; and
wherein the execution of the script is performed in response to determining that the number of previous executions of the script on the user system is smaller than the maximum execution count.

16. The computer program product of claim 14, wherein the signature of the package is verified using a public-private pair key scheme.

17. A computer system comprising a processor and a computer-readable storage medium having computer-readable program code embodied therewith, the computer-readable program code configured to perform a method comprising:
detecting an error in the computer computing system provided by a service provider, a user accessing the service provider via a service interface;
receiving by the computer system a signed package in accordance with the detected error in the user computing system, the package comprising at least a script for correcting or diagnosing the detected error by the service provider without having to find corrections or diagnoses locally in the user computing system;
verifying the authenticity of the package using a signature of the package; and
executing the script if the package is authentic, the script enabling one or more root causes of the detected error in the user computing system to be identified.

18. The computer system of claim 17, wherein the package comprises metadata, the metadata comprising a maximum execution count; and
wherein the execution of the script is performed in response to determining that the number of previous executions of the script on the user system is smaller than the maximum execution count.

19. The computer system of claim 17, wherein the signature of the package is verified using a public-private pair key scheme.

20. The computer system of claim 17, wherein the method further comprises:
receiving a support request from a user of the user system indicating the detected error, authenticating the user, wherein the package is provided by a problem management system if the user is authenticated.

\* \* \* \* \*